(12) United States Patent
Kim et al.

(10) Patent No.: US 9,436,041 B2
(45) Date of Patent: Sep. 6, 2016

(54) DISPLAY DEVICE

(71) Applicant: Samsung Display Co., Ltd., Yongin-si (KR)

(72) Inventors: Dong Hwan Kim, Asan-si (KR); Si Kwang Kim, Daegu (KR); Ha-Young Park, Uijeongbu-si (KR); Tae Woon Cha, Seoul (KR); Se Hee Han, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/949,379

(22) Filed: Nov. 23, 2015

(65) Prior Publication Data

US 2016/0077366 A1 Mar. 17, 2016

Related U.S. Application Data

(63) Continuation of application No. 14/137,068, filed on Dec. 20, 2013, now Pat. No. 9,195,099.

(30) Foreign Application Priority Data

Jan. 10, 2013 (KR) .................. 10-2013-0002980

(51) Int. Cl.
*G02F 1/1343* (2006.01)
*G02F 1/1341* (2006.01)
(Continued)

(52) U.S. Cl.
CPC ............ *G02F 1/1341* (2013.01); *G02F 1/1368* (2013.01); *G02F 1/133377* (2013.01);
(Continued)

(58) Field of Classification Search
CPC . G02F 1/13394; G02F 1/1334; G02F 1/1339
USPC .................. 349/156, 86, 153, 190
See application file for complete search history.

(56) References Cited

U.S. PATENT DOCUMENTS

| 6,141,072 A | 10/2000 | Drabik et al. |
| 6,400,430 B2 | 6/2002 | Nakao et al. |

(Continued)

FOREIGN PATENT DOCUMENTS

| CN | 103631061 | 3/2014 |
| EP | 2458432 | 5/2012 |

(Continued)

OTHER PUBLICATIONS

European Patent Office Extended Search Report dated May 2, 2014, in Application No. 14150425.8.

(Continued)

*Primary Examiner* — Thanh-Nhan P Nguyen
(74) *Attorney, Agent, or Firm* — H.C. Park & Associates, PLC

(57) ABSTRACT

A display includes a plurality of pixel columns and a plurality of pixel rows including a first pair of pixel rows and a second pair of pixel rows adjacent to each other. The LCD also includes a first gate line and a second gate line positioned between the first pair of pixel rows and the second pair of pixel rows, a microcavity layer including a plurality of liquid crystal injection holes, and a common electrode positioned on the microcavity layer. The LCD also includes a supporting member positioned on a common electrode and a capping layer positioned on a supporting member to cover the liquid crystal injection holes. The plurality of liquid crystal injection holes may be positioned between the first pair of pixel rows and the second pair of pixel rows.

13 Claims, 17 Drawing Sheets

(51) Int. Cl.
*G02F 1/1333* (2006.01)
*G02F 1/1362* (2006.01)
*G02F 1/1335* (2006.01)
*G02F 1/1368* (2006.01)

(52) U.S. Cl.
CPC ... *G02F1/133512* (2013.01); *G02F 1/133514* (2013.01); *G02F 1/134336* (2013.01); *G02F 1/136286* (2013.01); *G02F 2001/13415* (2013.01); *G02F 2001/133368* (2013.01); *G02F 2201/40* (2013.01)

(56) References Cited

U.S. PATENT DOCUMENTS

| | | | |
|---|---|---|---|
| 6,912,038 | B2 | 6/2005 | Liao et al. |
| 7,123,319 | B2 * | 10/2006 | Broer .................... C09K 19/00 349/122 |
| 7,706,044 | B2 | 4/2010 | Lin et al. |
| 2006/0146267 | A1 * | 7/2006 | Choi ................. G02F 1/133377 349/156 |
| 2007/0132934 | A1 * | 6/2007 | Amano ................. G02F 1/1339 349/153 |
| 2012/0062448 | A1 * | 3/2012 | Kim .................. G02F 1/133377 345/55 |
| 2013/0321734 | A1 | 12/2013 | Won et al. |
| 2013/0335664 | A1 | 12/2013 | Shim et al. |
| 2014/0055440 | A1 | 2/2014 | Cho et al. |
| 2014/0055721 | A1 | 2/2014 | Choi et al. |
| 2014/0055726 | A1 | 2/2014 | Cho et al. |
| 2014/0104532 | A1 | 4/2014 | Cho et al. |
| 2014/0152948 | A1 | 6/2014 | Chae et al. |

FOREIGN PATENT DOCUMENTS

| | | |
|---|---|---|
| JP | 2003-330130 | 11/2003 |
| JP | 2014-041352 | 3/2014 |
| KR | 10-2003-0063656 | 7/2003 |
| KR | 10-2007-0091794 | 9/2007 |
| KR | 10-2013-0107952 | 10/2013 |
| KR | 10-2013-0134153 | 12/2013 |
| KR | 10-2013-0140325 | 12/2013 |
| KR | 10-2014-0025081 | 3/2014 |
| KR | 10-2014-0025171 | 3/2014 |
| KR | 10-2014-0025739 | 3/2014 |
| KR | 10-2014-0027794 | 3/2014 |
| KR | 10-2014-0048731 | 4/2014 |

OTHER PUBLICATIONS

Non-Final Office Action issued on Mar. 18, 2015 in U.S. Appl. No. 14/137,068.

Notice of Allowance issued on Jul. 7, 2015 in U.S. Appl. No. 14/137,068.

* cited by examiner

DISPLAY DEVICE

CROSS REFERENCE TO RELATED APPLICATIONS

This application is a continuation of U.S. patent application Ser. No. 14/137,068, filed on Dec. 20, 2013, which claims priority from and the benefit of Korean Patent Application No. 10-2013-0002980 filed on Jan. 10, 2013, which are hereby incorporated by reference for all purposes as if fully set forth herein.

BACKGROUND OF THE INVENTION

1. Field of the Invention

Exemplary embodiments of the present invention relate to a display device.

2. Description of the Background

A liquid crystal display (LCD) is a widely-used flat panel display device that includes two display panels. The display panels have field generating electrodes, such as a pixel electrode and a common electrode, and a liquid crystal layer is interposed between the field generating electrodes.

The LCD may generate an electric field in the liquid crystal layer when a voltage is applied to the field generating electrodes resulting in reorientation of liquid crystal molecules in the liquid crystal layer and polarization of incident light, thereby causing an image to be displayed.

A technique for realizing a displayed image by forming a cavity per pixel unit and filling a liquid crystal in the cavity has been developed. This technique is realized by forming a sacrificial layer of organic materials, forming a supporting member thereon, removing the sacrificial layer, and filling a liquid crystal through liquid crystal injection holes into an empty space formed by removing the sacrificial layer.

When the liquid crystal injection holes for injecting the liquid crystal into each pixel area are separated from each other and are not connected to each other, an amount of the liquid crystal injected into each pixel area should be controlled and the liquid crystal should be dripped into the liquid crystal injection hole of each pixel area. However, it is difficult to correctly control the amount of the liquid crystal. In addition, a liquid crystal material remaining after being injected through the liquid crystal injection hole may flow out near an outermost pixel.

Also, to inject the liquid crystal via the liquid crystal injection holes and the empty space formed by removing the sacrificial layer, the removed portion of the sacrificial layer should have a width of more than a predetermined value.

When the width of the removed portion of the sacrificial layer is very narrow, it is difficult to drip the liquid crystal near the liquid crystal injection hole, and consequently, the liquid crystal layer may not be filled in the empty space where the sacrificial layer is removed.

When the width of the removed portion of the sacrificial layer is very wide, it is easy to drip the liquid crystal material near the liquid crystal injection hole, such that the liquid crystal layer is easily filled; however, an area of the display area where the liquid crystal layer is filled is decreased.

Meanwhile, various techniques for realizing a 2-dimensional (2D) image and a 3-dimensional (3D) image have been developed for liquid crystal displays.

Among them, in a 3D display using a patterned retarder, a left image and a right image are alternately displayed for a pixel row of the display device. The left eye image may be referred to as an image recognized by a left eye of a user, and the right image may be referred to as an image recognized by a right eye of the user. In the case of a 3D display in which the left image and the right image are alternately displayed according to pixel row, the left image and the right image influence each other according to the position of the user.

To solve this problem, a black matrix extending in a row direction between a pixel row displaying the left image and a pixel row displaying the right image and having a wide width is formed to reduce the interference of the image.

However, when forming the black matrix having a wide width between pixel columns, an entire aperture ratio of the display device is decreased and a resolution of the display device is also decreased.

The above information disclosed in this Background section is only for enhancement of understanding of the background of the invention and therefore the above information may contain information that does not form prior art that is already known to a person of ordinary skill in the art.

SUMMARY OF THE INVENTION

Exemplary embodiments of the present invention provide a display device in which a liquid crystal material is correctly dripped to a liquid crystal injection hole without a decrease of an aperture ratio of the liquid crystal display.

Exemplary embodiments of the present invention also provide a display device in which an amount of the liquid crystal material is easily controlled and the liquid crystal material remaining after being injected through the liquid crystal injection hole is prevented from flowing past an outermost pixel when filling the liquid crystal layer.

Exemplary embodiments of the present invention also provide a display device realizing a 3D display using a patterned retarder while preventing a aperture ratio deterioration according to a black matrix.

Additional features of the invention will be set forth in the description which follows, and in part will be apparent from the description, or may be learned by practice of the invention.

Exemplary embodiments of the present invention disclose a display device including a substrate and a plurality of pixel rows and a plurality of pixel columns disposed on the substrate. The plurality of pixel rows includes a first pair of pixel rows and a second pair of pixel rows adjacent to the first pair of pixel rows. The LCD also includes a first gate line and a second gate line disposed on the substrate and disposed between the first pair of pixel rows and the second pair of pixel rows; a data line disposed between two adjacent pixel columns among the plurality of pixel columns; a plurality of pixel electrodes; and a microcavity layer disposed on the plurality of pixel electrodes. The microcavity layer includes a plurality of material injection holes. The LCD also includes a common electrode disposed on the microcavity layer; a supporting member disposed on the common electrode; and a capping layer disposed on the supporting member. The capping layer covers the plurality of material injection holes. The plurality of material injection holes is disposed between the first pair of pixel rows and the second pair of pixel rows.

Exemplary embodiments of the present invention also disclose a display device including a substrate and a dam. The substrate includes a peripheral area and a pixel area near the peripheral area. The pixel area includes a plurality of pixel rows and a plurality of pixel columns. The dam is disposed on the substrate and in the peripheral area. The pixel area includes a microcavity layer having a liquid crystal injection hole, a common electrode disposed on the microcavity layer, a supporting member disposed on the common electrode, and a capping layer disposed on the supporting member and covering the liquid crystal injection hole. Portions of the supporting member are separated by a groove. At least one boundary of the liquid crystal injection hole is determined by the groove. The groove extends to a left end of the plurality of pixel rows and a right end of the plurality of pixel rows.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
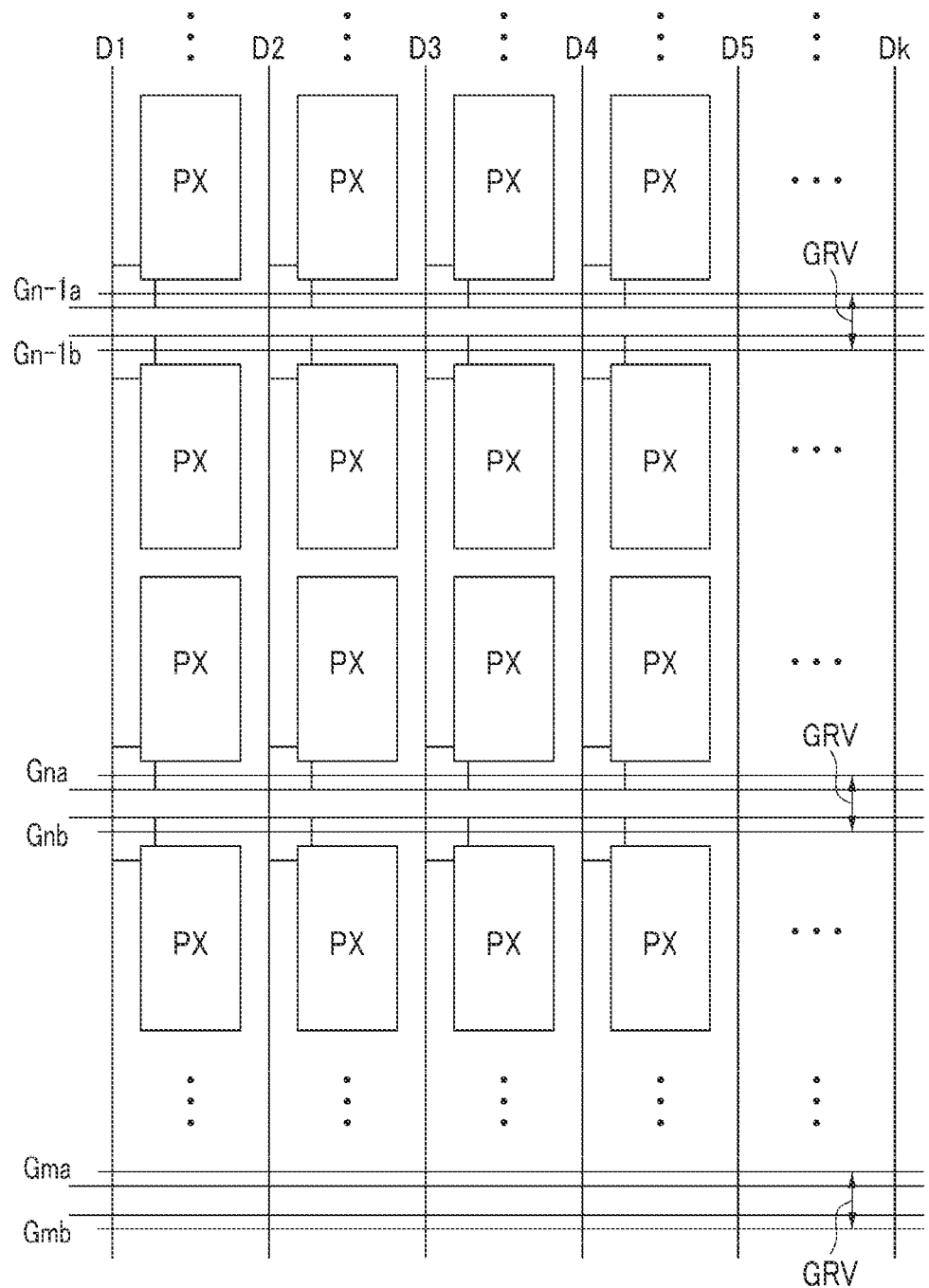
FIG. 1 is a layout view of an arrangement of a signal line and a pixel of a display device according to exemplary embodiments of the present invention.

Exemplary embodiments of the invention are described more fully hereinafter with reference to the accompanying drawings. The invention may, however, be embodied in many different forms and should not be construed as limited to the exemplary embodiments set forth herein. Rather, the exemplary embodiments are provided so that this disclosure is thorough and complete, and will convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Hereinafter, exemplary embodiments of the present invention are described in detail with reference to the accompanying drawings. A display device according to exemplary embodiments of the present invention will be described with reference to FIG. 1. FIG. 1 is a layout view of an arrangement of signal lines and pixels in a display device according to exemplary embodiments of the present invention.

Referring to FIG. 1, a display device includes a plurality of gate lines Gn−1a, Gn−1b, Gna, Gnb, . . . , Gma, and Gmb extending in a first direction, a plurality of data lines D1, D2, D3, D4, D5, . . . , and Dk extending in a second direction (where k, n, and m are any suitable whole number greater than one), and a plurality of pixels PX connected to the gate lines and the data lines.

The plurality of gate lines Gn−1a, Gn−1b, Gna, Gnb, . . . , Gma, and Gmb include a first pair gate lines Gn−1a and Gn−1b, a second pair gate lines Gna and Gnb, and a third pair gate lines Gn+1a and Gn+1b. Each pair of gate lines Gn−1a and Gn−1b, Gna and Gnb, and Gn+1a and Gn+1b is positioned per two pixel rows. For example, each pair of gate lines Gn−1a and Gn−1b, Gna and Gnb, and Gn+1a and Gn+1b is positioned between an adjacent pair of two pixel rows.

A groove GRV may overlap each pair of gate lines Gn−1a and Gn−1b, Gna and Gnb, and Gn+1a and Gn+1b. The groove GRV may be a liquid crystal injection hole where a material such as a liquid crystal layer is injected, as shall be described in further detail below.

The groove GRV may extend in a direction that gate lines Gn−1a, Gn−1b, Gna, Gnb, . . . , Gma, and Gmb extend. The groove GRV may have a wide width without deterioration of the aperture ratio of the display device when the groove overlaps each pair of gate lines Gn−1a and Gn−1b, Gna and Gnb, and Gn+1a and Gn+1b in contrast to when a groove GRV overlaps just a single gate line.

Figure 2:
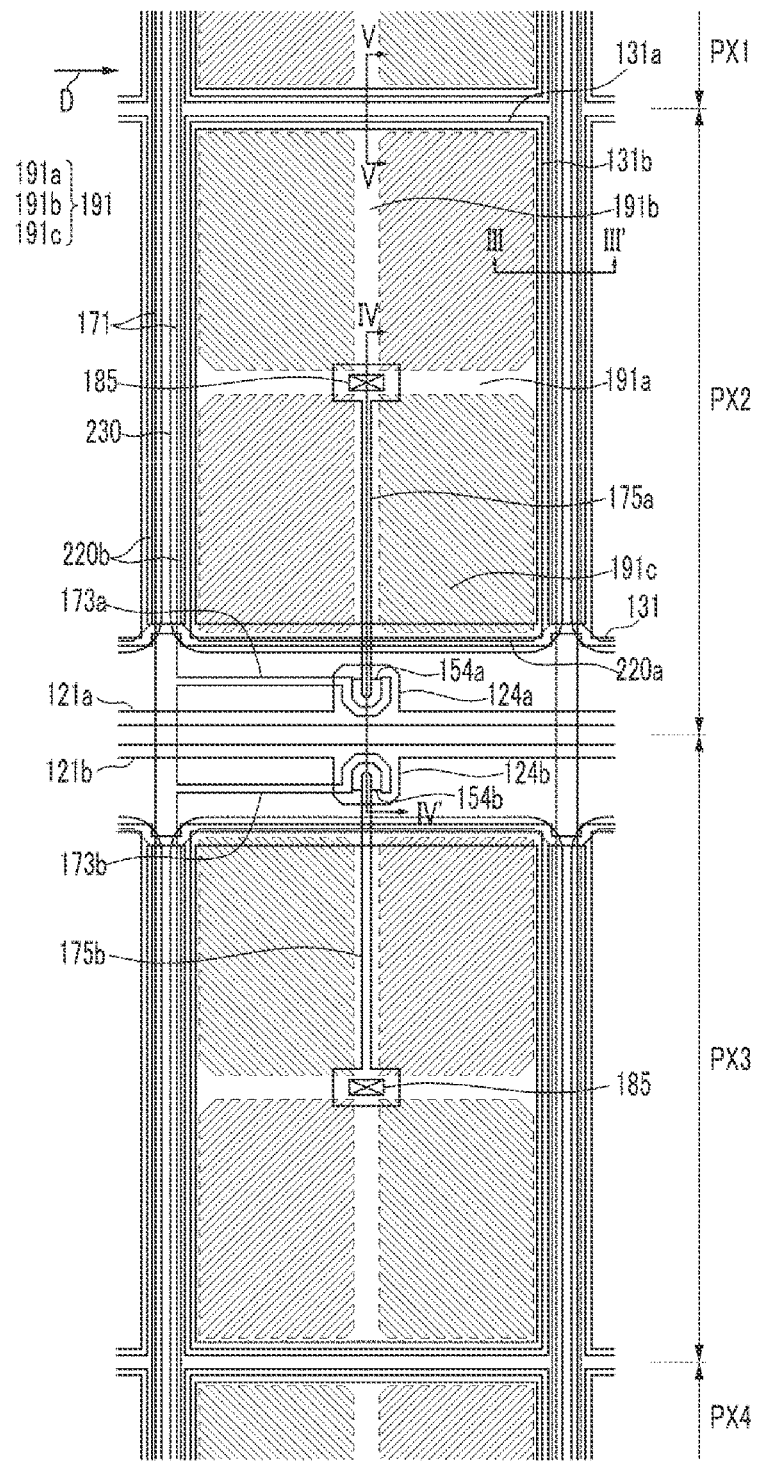
FIG. 2 is a layout view of a part of a pixel of a display device according to exemplary embodiments of the present invention.
Figure 3:
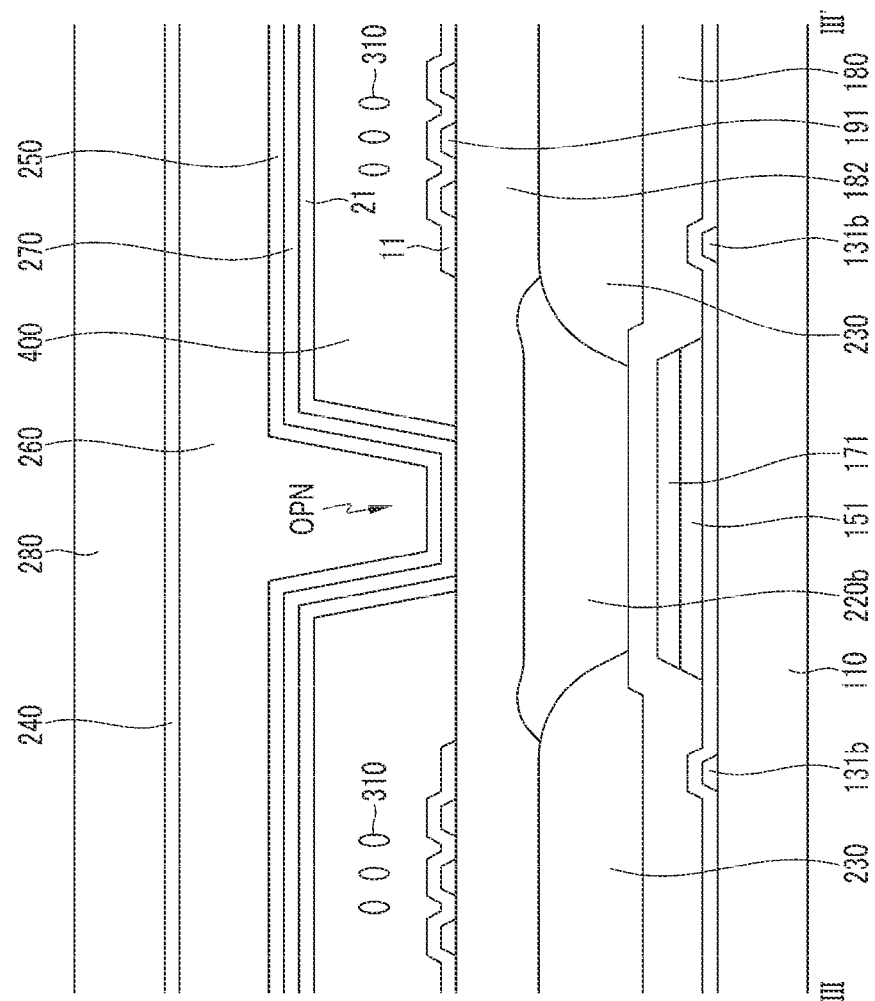
FIG. 3 is a cross-sectional view taken along the line III-III' of the display device of FIG. 2.
Figure 4:
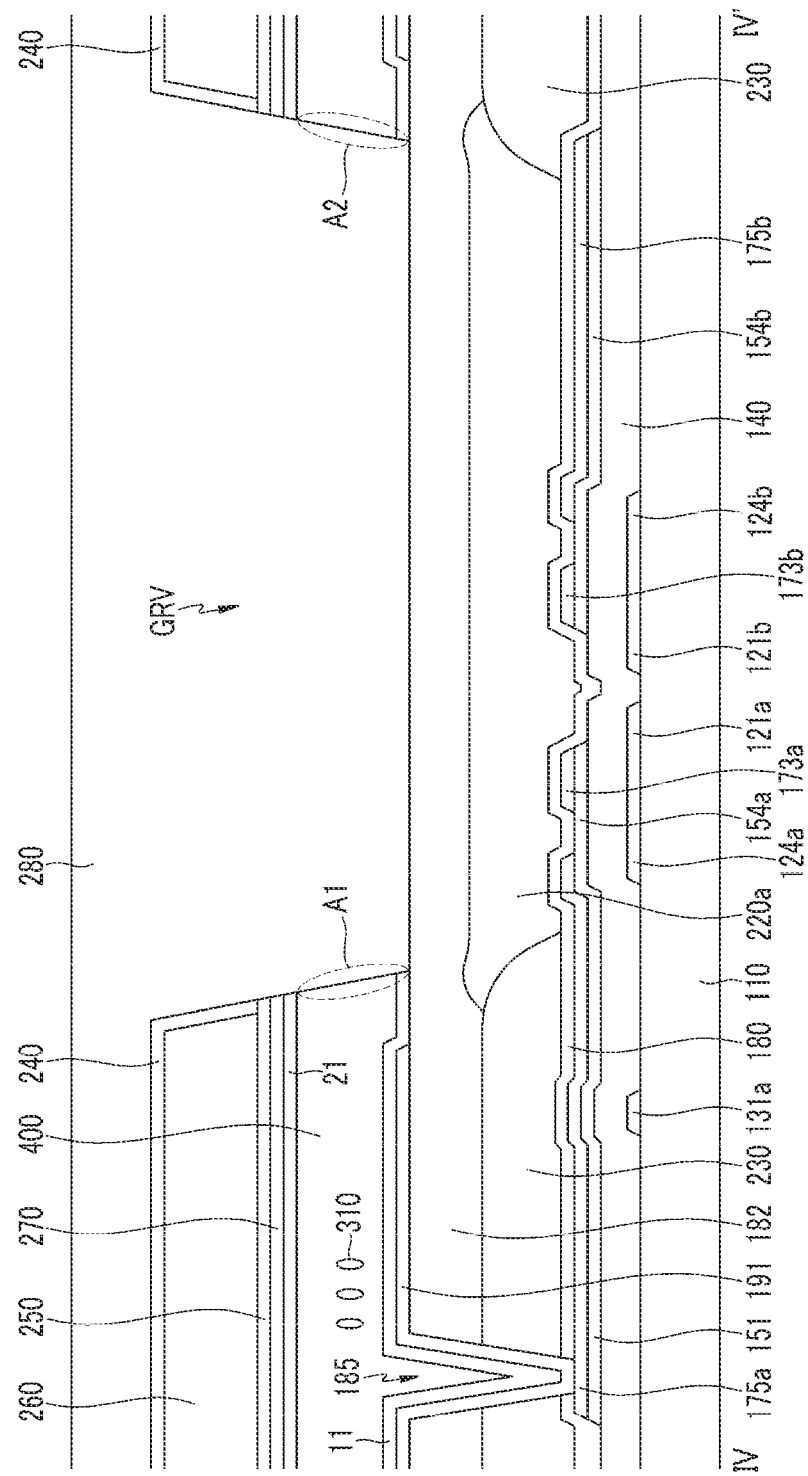
FIG. 4 is a cross-sectional view taken along the line IV-IV' of the display device of FIG. 2.
Figure 5:
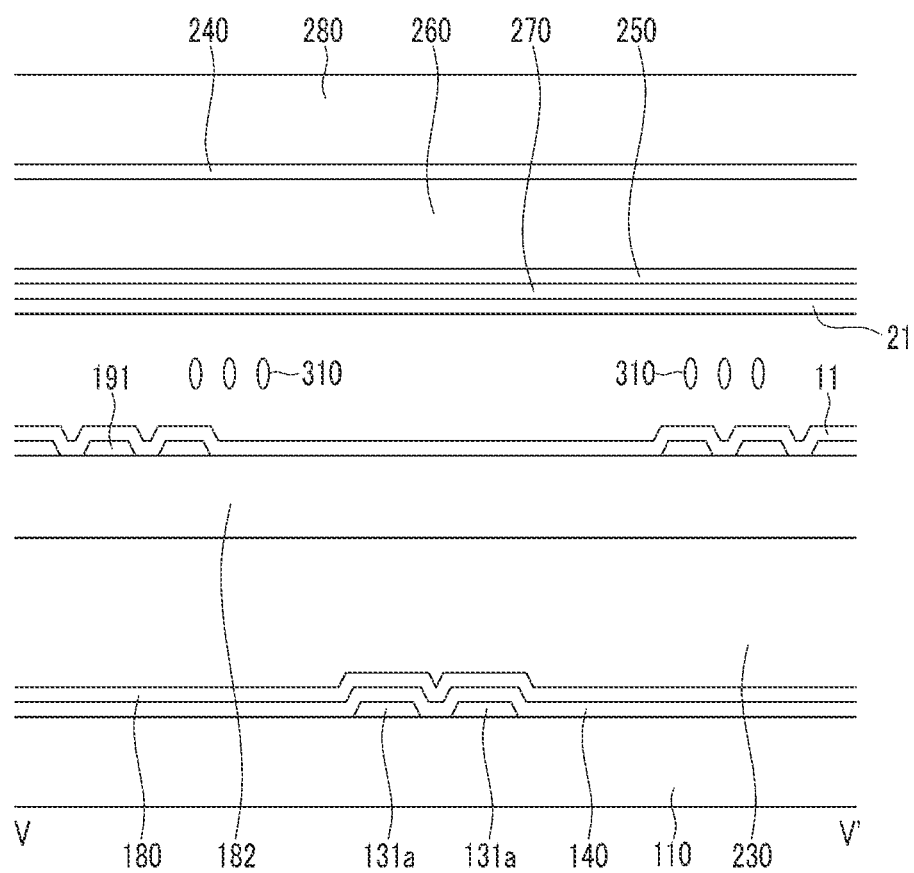
FIG. 5 is a schematic cross-sectional view taken along the line V-V' of the display device of FIG. 2.

Next, a detailed structure of the LCD will be described with reference to FIGS. 2, 3, 4, and 5. FIG. 2 is a layout view of a display device according to exemplary embodiments of the present invention. FIG. 3 is a cross-sectional view taken along the line III-III' of the display device of FIG. 2. FIG. 4 is a cross-sectional view taken along the line IV-IV' of the display device of FIG. 2. FIG. 5 is a schematic cross-sectional view taken along the line V-V' of the display device of FIG. 2.

Referring to FIGS. 2, 3, 4, and 5, a first gate line 121a, a second gate line 121b, and a storage electrode line 131 are formed on a substrate 110 made of transparent glass or plastic. The first gate line 121a and the second gate line 121b are positioned as a pair between two pairs of pixels PX1 and PX2, and PX3 and PX4.

The first gate line 121a and the second gate line 121b may transmit a gate signal and extend substantially in a horizontal (e.g., latitudinal) direction. The first gate line 121a may include a first gate electrode 124a, and the second gate line 121b may include a second gate electrode 124b.

The storage electrode line 131 may transmit a predetermined voltage, such as a common voltage Vcom, and may include a longitudinal portion 131b extending substantially perpendicular to the first gate line 121a and the second gate line 121b, and a transverse portion 131a connected to an end of the longitudinal portion 131b.

A gate insulating layer 140 formed of silicon nitride is positioned on the gate lines 121a and 121b and the storage electrode line 131. Semiconductor layers 151, 154a, and 154b made of amorphous or crystalline silicon or an oxide semiconductor are formed on the gate insulating layer 140. The semiconductor layers 151, 154a, and 154b include a plurality of semiconductor stripes 151 extending mainly in a longitudinal direction, and a first channel part 154a and a second channel part 154b extending toward the gate electrodes 124a and 124b from each semiconductor stripe 151.

A data line 171, source electrodes 173a and 173b connected to the data line 171, and drain electrodes 175a and 175b separated from the source electrodes 173a and 173b are formed on the semiconductor layers 151, 154a, and 154b and the gate insulating layer 140. Ohmic contacts (not shown) may be formed between the first channel part 154a and the second channel part 154b of the semiconductor layer and the source electrodes 173a and 173b, respectively, and between the first channel part 154a and the second channel part 154b and the drain electrodes 175a and 175b, respectively. The ohmic contacts may be formed of a material such as n+ hydrogenated amorphous silicon in which an n-type impurity is doped with a high concentration, or of silicide.

The data line 171 may transmit a data signal, and may extend in the longitudinal direction and intersect the gate lines 121a and 121b. The data line 171 is connected to the first source electrode 173a extending toward the first gate electrode 124a and the second source electrode 173b extending toward the second gate electrode 124b. The first drain electrode 175a and the second drain electrode 175b are separated from the data line 171. The first drain electrode 175a faces the first source electrode 173a, and the second drain electrode 175b faces the second source electrode 173b.

The first drain electrode 175a and the second drain electrode 175b include bar parts extending in a direction parallel to the data line 171. The drain electrodes 175a and 175b may have an expansion portion having a width that is widened from an end of the bar part of the drain electrodes 175a and 175b. Although shown as having a bar shape, the drain electrodes 175a and 175b may have any suitable shape.

The gate electrodes 124a and 124b, the source electrodes 173a and 173b, the drain electrodes 175a and 175b, and the first channel part 154a and the second channel part 154b respectively form thin film transistors.

A first thin film transistor including the first gate electrode 124a connected to the first gate line 121a, the first source electrode 173a, the first drain electrode 175a, and the first channel part 154a may be connected to a pixel electrode 191 of the second pixel PX2. A second thin film transistor including the second gate electrode 124b connected to the second gate line 121b, the second source electrode 173b, the second drain electrode 175b, and the second channel part 154b may be connected to the pixel electrode 191 of the third pixel PX3.

The semiconductor layers 151, 154a, and 154b may have substantially the same planar shape as the data conductors 171, 173a, 173b, 175a, and 175b and the underlying ohmic contact except for the channel regions between the source electrode 173a and the drain electrode 175a and between the source electrode 173b and the drain electrode 175b. The data wire, including the data line 171, the source electrodes 173a and 173b, and the drain electrodes 175a and 175b, has a structure obtained by forming the underlying ohmic contact (not shown) and semiconductor layers 151, 154a, and 154b through one mask.

The first channel part 154a and the second channel part 154b may include a portion that is exposed and not covered by the source electrodes 173a and 173b and the drain electrodes 175a and 175b.

A passivation layer 180 is formed on the data wires 171, 173a, 173b, 175a, and 175b, and the exposed first channel part 154a and second channel part 154b. In some cases, the passivation layer 180 is made of an inorganic insulator, such as silicon nitride and silicon oxide. In some cases, the passivation layer 180 may be made of an organic insulator and may have a flat surface. In some cases, the passivation layer 180 may be made of a combination of organic and inorganic insulators.

An organic layer 230 is disposed on the passivation layer 180 except for a location where the first and second thin film transistors are formed. The organic layer 230 may extend according to a column direction of the pixel electrode 191. The organic layer 230 may be a color filter, which may filter radiation (e.g., light) according to one of the primary colors, such as red, green, and blue. However, the color filter may not be limited to the three primary colors, and may filter radiation (e.g., light) according to one of cyan, magenta, yellow, and a white-based color.

The neighboring organic layers 230 may be separated according to a horizontal direction D ("D" is shown in FIG. 2) and a vertical direction crossing thereto.

Referring to FIG. 3, a longitudinal light blocking member 220b is disposed between the organic layers 230 separated in the horizontal direction D. The longitudinal light blocking member 220b may overlap each edge of the neighboring organic layers 230. In some cases, widths of the longitudinal light blocking members 220b overlapping both edges of the organic layers 230 may be substantially the same.

Referring to FIG. 4, a transverse light blocking member 220a is disposed between the organic layers 230. The transverse light blocking member 220a may overlap each edge of the neighboring organic layers 230. In some cases, widths of the transverse light blocking members 220a overlapping both edges of the organic layers 230 may be substantially the same.

The transverse light blocking member 220a and the longitudinal light blocking member 220b may be referred to as a black matrix, and may prevent light leakage. A planarization layer 182 is formed on the transverse light blocking member 220a, the longitudinal light blocking member 220b, and the organic layer 230. The planarization layer 182 may be made of the organic material and may provide a planar surface over the underlying layers.

The pixel electrode 191 is disposed on the planarization layer 182. The pixel electrode 191 is electrically connected to the drain electrodes 175a and 175b of the first and second thin film transistors through a contact hole 185. For instance, the pixel electrode 191 of the second pixel PX2 may be connected to the first drain electrode 175a, and the pixel electrode 191 of the third pixel PX3 may be connected to the second drain electrode 175b.

Each pixel electrode 191 may be formed as a fine slit electrode, and a shape of the fine slit electrode may be quadrangular. The pixel electrode 191 may include a crossed-shape stem including a transverse stem 191a and a longitudinal stem 191b intersecting the transverse stem 191a. Further, the pixel electrode 191 may include four sub-regions divided by the transverse stem 191a and the longitudinal stem 191b, and each sub-region may include a plurality of fine branch portions 191c.

One of the fine branch portions 191c of the fine slit electrode may obliquely extend to an upper left direction from the transverse stem 191a or the longitudinal stem 191b, and the other fine branch portion 191c may obliquely extend to an upper right direction from the transverse stem 191a or the longitudinal stem 191b. Another fine branch portion 191c may extend to a lower left direction from the transverse stem portion 191a or the longitudinal stem portion 191b, and another fine branch portion 191c may obliquely extend to a lower right direction from the transverse stem 191a or the longitudinal stem 191b. The fine branch portions 191c of two adjacent sub-regions may be orthogonal to each other. Although not illustrated, in some cases, a width of the fine branch portion 191c may become gradually wider.

The bar portion of the drain electrodes 175a and 175b may be elongated according to the longitudinal stem 181b of the pixel electrode 191.

A contact hole 185 may be formed in the passivation layer 180, the organic layer 230, and the planarization layer 182. The drain electrodes 175a and 175b and the pixel electrode 191 are connected to each other through the contact hole 185. The contact hole 185 may be formed at the crossing position of the transverse stem 191a and the longitudinal stem 191b of the pixel electrode 191. As shown in FIG. 2, wide ends of the drain electrodes 175a and 175b may overlap the crossing position of the transverse stem 191a and the longitudinal stem 191b, and the contact hole 185 is formed at this overlap location.

In the subregions neighboring each other, directions that liquid crystal molecules 310 are inclined may be different from each other. The transverse stem 191a and the longitudinal stem 191b correspond to a boundary region between neighboring subregions. This boundary region corresponds to a non-transmission portion where the inclination direction of the liquid crystal molecules 310 is not determined. Accordingly, although the drain electrodes 175a and 175b and the contact hole 185 are positioned within the pixel area PX, a decrease of the aperture ratio may be minimized.

A microcavity layer 400 may be disposed on the pixel electrode 191. The microcavity layer 400 is injected with the liquid crystal material including the liquid crystal molecules 310, and the microcavity layer 400 has a liquid crystal injection hole A. The microcavity layer 400 may be formed according to a column direction (e.g., vertical direction) of the pixel electrode 191. The liquid crystal injection hole A may include at least a first liquid crystal injection hole A1 exposing the microcavity layer 400 of the second pixel PX2 connected to the first gate line 121a and a second liquid crystal injection hole A2 exposing the microcavity layer 400 of the third pixel PX3 connected to the second gate line 121b.

A lower alignment layer 11 may be formed on the pixel electrode 191, and an upper alignment layer 21 may be formed on the microcavity layer 400.

An alignment material forming the alignment layers 11 and 21 and a liquid crystal material including the liquid crystal molecules 310 may be injected at the microcavity layer 400 by using any suitable means, such as, for example, a capillary force.

A common electrode 270 and an overcoat 250 are disposed on the microcavity layer 400. The common electrode 270 may receive a common voltage and may generate an electric field along with the pixel electrode 191 applied with the data voltage to determine an inclination direction of the liquid crystal molecules 310 positioned in the microcavity layer 400. The common electrode 270 may form a capacitor along with the pixel electrode 191, such that the applied voltage is maintained after the thin film transistor is turned off. The overcoat 250 may be formed of silicon nitride (SiNx) or silicon oxide ($SiO_2$).

A supporting member 260 is formed on the overcoat 250. The supporting member 260 may include silicon oxycarbide (SiOC), a photoresist, or other organic materials. When the supporting member 260 includes silicon oxycarbide (SiOC), the supporting member 260 may be formed by a chemical vapor deposition method. When the photoresist is included, the supporting member 260 may be formed by a coating method. Since silicon oxycarbide (SiOC) has high transmittance and low layer stress, the supporting member 260 made of the silicon oxycarbide (SiOC) may also have high light transmission properties and high stability.

A groove GRV may be formed between portions of the microcavity layer 400, the upper alignment layer 21, the common electrode 270, the overcoat 250, and the supporting member 260, and may be formed on the transverse light blocking member 220a and the planarization layer 182. For example, the groove GRV may separate portions of the microcavity layer 400, the upper alignment layer 21, the common electrode 270, the overcoat 250, and the supporting member 260.

Referring to FIGS. 1, 2, 3, 4, and 5, the microcavity layer 400 may be divided by a plurality of grooves GRV formed at portions overlapping the gate lines 121a and 121b, and a plurality of microcavity layers 400 may be formed in the extending direction D of the gate line 121a. The plurality of microcavity layers 400 may correspond to two pairs of pixel areas (e.g., PX1 and PX2, and PX3 and PX4) adjacent in the column direction. The groove GRV formed between the microcavity layers 400 may overlap two gate lines 121a and 121b connected to the different pixel rows, and may be positioned according to the direction D in which two gate lines 121a and 121b are extended.

The liquid crystal injection holes A1 and A2 of the microcavity layer 400 form a region corresponding to a boundary portion between the groove GRV and the microcavity layer 400. The liquid crystal injection holes A1 and A2 may be formed according to the extending direction of the groove GRV. An open portion OPN formed above the longitudinal light blocking member 220b and between the microcavity layers 400 adjacent in the direction D that the gate lines 121a and 121b extend, may be covered by the supporting member 260, as shown in FIG. 3.

The liquid crystal injection holes A1 and A2 included in the microcavity layer 400 may be formed between the upper alignment layer 21 and the planarization layer 182, and, in some portions, between the upper alignment layer 21 and the lower alignment layer 11.

Among the liquid crystal injection holes A1 and A2 defined by the groove GRV, the first liquid crystal injection hole A1 may expose the microcavity layer 400 corresponding to the second pixel PX2 connected to the first gate line 121a, and the second liquid crystal injection hole A2 may expose the microcavity layer 400 corresponding to the third pixel PX3 connected to the second gate line 121b. In some cases, one of the first liquid crystal injection hole A1 and the second liquid crystal injection hole A2 may be omitted.

A protection layer 240 may be disposed on the supporting member 260. The protection layer 240 may be made of silicon nitride (SiNx) or silicon oxide (SiO2). A capping layer 280 may be disposed on the protection layer 240. The capping layer 280 may contact an upper surface and side wall of the supporting member 260, and the capping layer 280 may cover the liquid crystal injection holes A1 and A2 of the microcavity layer 400 exposed by the groove GRV. The capping layer 280 may be formed of a thermosetting resin, silicon oxycarbide (SiOC), or graphene.

Since graphene has strong impermeability against gas including helium and the like, graphene may effectively stop the liquid crystal injection holes A1 and A2 when used to form capping layer 280. Graphene is a material formed of carbon bonds, and therefore prevents the liquid crystal material from being contaminated even when contacting the capping layer 280. In addition, graphene may serve to protect the liquid crystal material from external oxygen and moisture.

The liquid crystal material may be injected through the liquid crystal injection holes A1 and A2 of the microcavity layer 400, such that the liquid crystal display may be formed without forming a separate upper substrate.

The overcoat (not illustrated) formed of an inorganic film or an organic film may be disposed on the capping layer 280. The overcoat may protect the liquid crystal molecules 310 injected into the microcavity layer 400 from external impact and may planarize the film.

Figure 6:
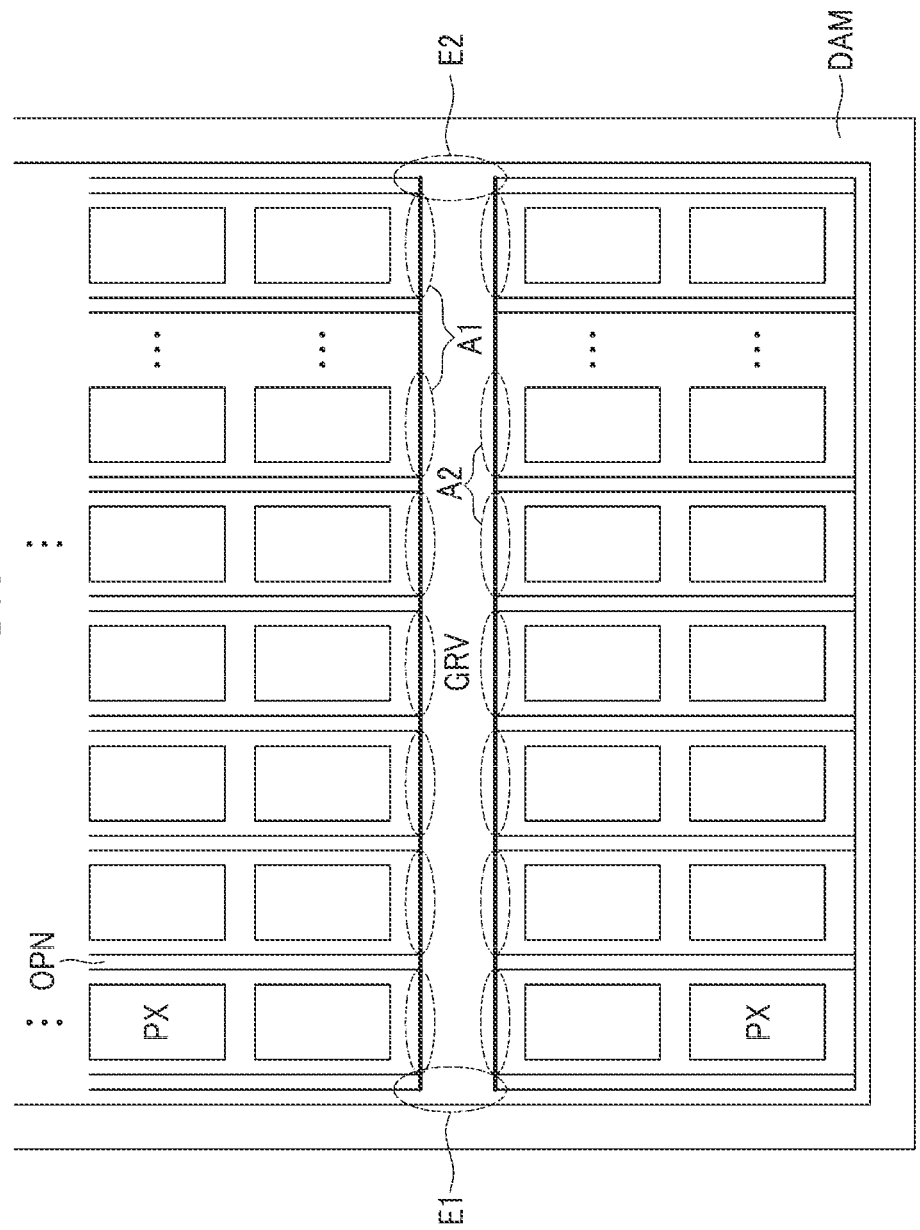
FIG. 6 is a layout view of a display device according to exemplary embodiments of the present invention.

Next, a display device according to exemplary embodiments of the present invention will be described with reference to FIG. 6. FIG. 6 is a layout view of a display device according to exemplary embodiments of the present invention.

Referring to FIG. 6, a display device includes a pixel area including a plurality of pixels PX and a dam DAM formed near the pixel area. An open portion OPN formed between the microcavity layers 400 injected with the liquid crystal material is formed between neighboring columns of the pixels PX. The open portion OPN may be covered by the supporting member 260 as shown in FIG. 3.

The groove GRV of the display device may extend to be connected to a left end E1 and a right end E2 of the pixel PX column. Accordingly, liquid crystal material provided at the groove GRV may be dispersed through the groove GRV. Therefore, when the liquid crystal material is injected through a plurality of liquid crystal injection holes A, a uniform amount of the liquid crystal material may be provided to a plurality of liquid crystal injection holes A. Also, when the liquid crystal material provided at the groove GRV is injected to a plurality of liquid crystal injection holes A, the liquid crystal material may be dispersed through the groove GRV. The dam DAM may prevent the liquid crystal material from leaking into the peripheral area.

As in the display device described with reference to FIGS. 1, 2, 3, 4, and 5, the groove GRV of the display device may be formed between two pairs of pixel PX rows adjacent to each other. The groove GRV defining the liquid crystal injection hole A of the display device may overlap two gate lines 121a and 121b such that a width of the groove GRV may be widened without deterioration of the aperture ratio of the display device. Accordingly, in the process of dripping the liquid crystal material in the manufacturing process of the display device, the liquid crystal material may be correctly dripped in the groove GRV.

The dam DAM may be formed by using at least one of the organic layer 230, the transverse light blocking member 220a, the longitudinal light blocking member 220b, and the supporting member 260.

Next, a manufacturing method of a display device according to exemplary embodiments of the present invention will be described with reference to FIGS. 7, 8, 9, 10, 11, 12, 13, 14, 15, and 16.

Figure 7:
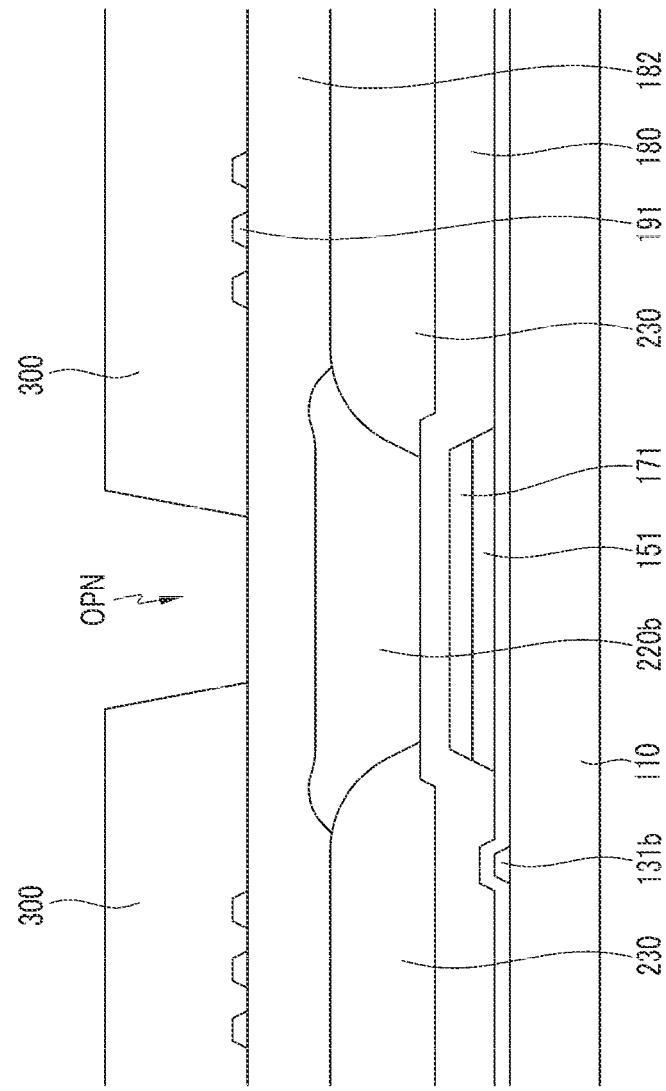
FIGS. 7, 8, 9, 10, 11, 12, 13, 14, 15, and 16 are cross-sectional views of a part of a display device in a manufacturing method of a display device according to exemplary embodiments of the present invention.
Figure 8:
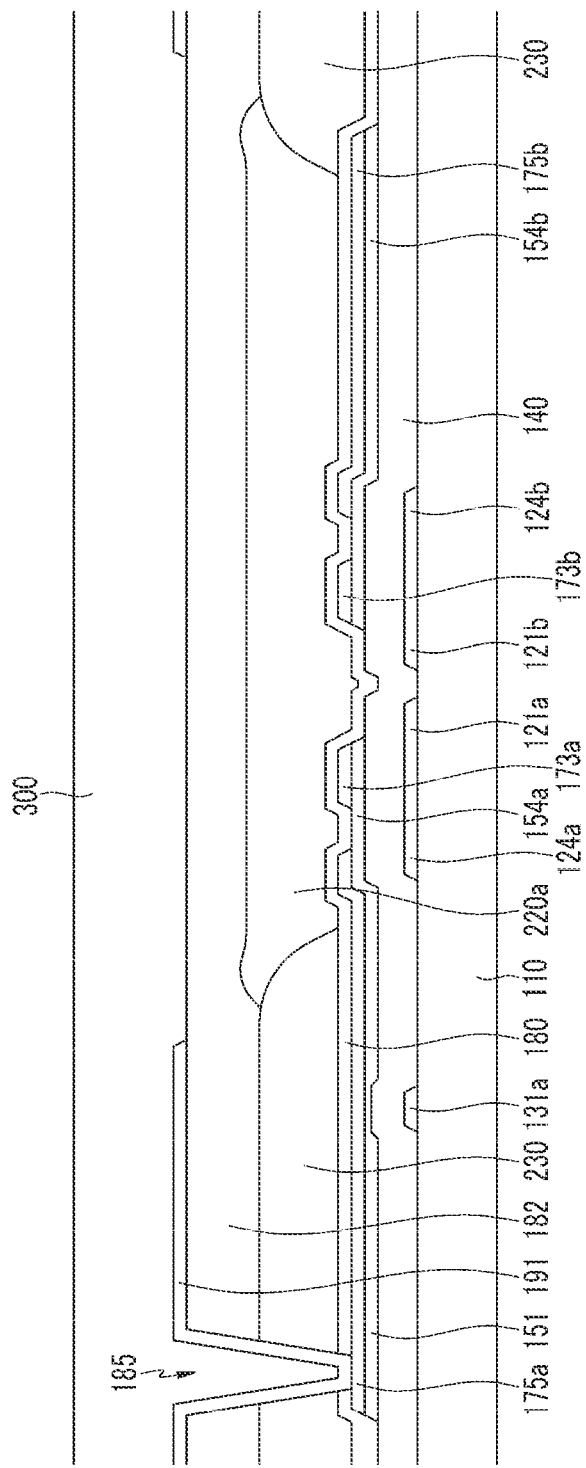
Figure 9:
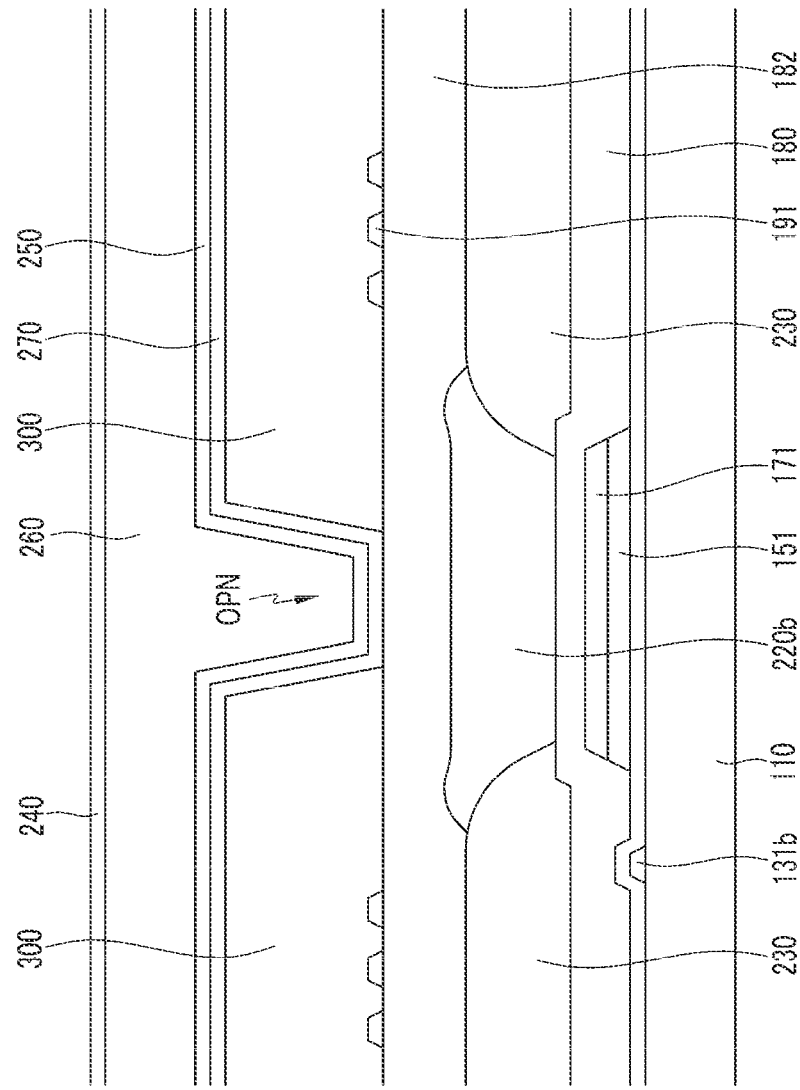

FIG. 7 and FIG. 9 are cross-sectional views taken along the lines III-III' of FIG. 2 according to a manufacturing method of the display device. FIGS. 8, 10, 11, and 12 are cross-sectional views taken along the line IV-IV' of FIG. 2 according to a manufacturing method of the display device. FIGS. 13, 14, 15, and 16 are cross-sectional views of a portion of a pixel PX region and a dam DAM region according to a manufacturing method of the display device.

Firstly, referring to FIG. 7 and FIG. 8, gate electrodes 124a and 124b and a storage electrode line 131 are formed on a substrate 110. A gate insulating layer 140 is formed on the gate electrodes 124a and 124b and a storage electrode line 131. Semiconductors 151, 154a, and 154b are formed on the gate insulating layer 140. Data conductors 171, 173a, 173b, 175a, and 175b are formed on the semiconductors 151, 154a, and 154b. A passivation layer 180, an organic layer 230, light blocking members 220a and 220b, and a planarization layer 182 are formed on the data conductors 171, 173a, 173b, 175a, and 175b.

A pixel electrode 191 is formed on the planarization layer 182. A sacrificial layer 300, including silicon oxycarbide (SiOC) or a photoresist, is formed on the pixel electrode 191. The sacrificial layer 300 may be formed of an organic material other than the silicon oxycarbide (SiOC) or the photoresist.

As shown in FIG. 7, the sacrificial layer 300 is removed at the open portion OPN located between two adjacent pixel PX columns.

Figure 10:
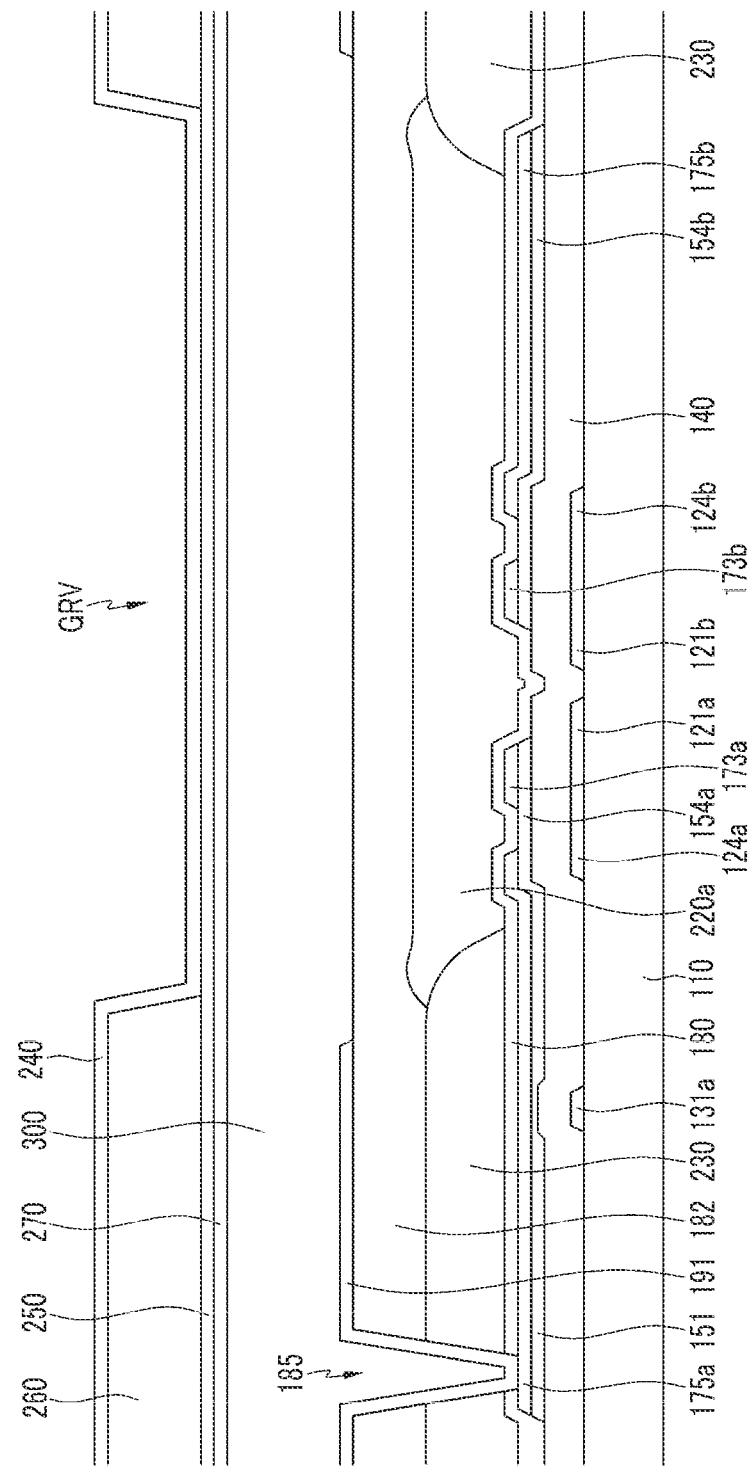

Next, as shown in FIG. 9 and FIG. 10, a common electrode 270, an overcoat 250, and a supporting member 260 are sequentially formed on the sacrificial layer 300. The common electrode 270 may be formed of a transparent conductor, such as ITO or IZO, and the overcoat 250 may be formed of silicon nitride (SiNx) or silicon oxide (SiO2). As shown in FIG. 10, the supporting member 260 is patterned to form a groove GRV exposing the overcoat 250 corresponding to the light blocking member 220a. The supporting member 260 may be formed of a different material from the previously formed sacrificial layer 300. A protection layer 240 is formed on the supporting member 260. The protection layer 240 may be formed of silicon nitride (SiNx) or silicon oxide ($SiO_2$).

Figure 11:
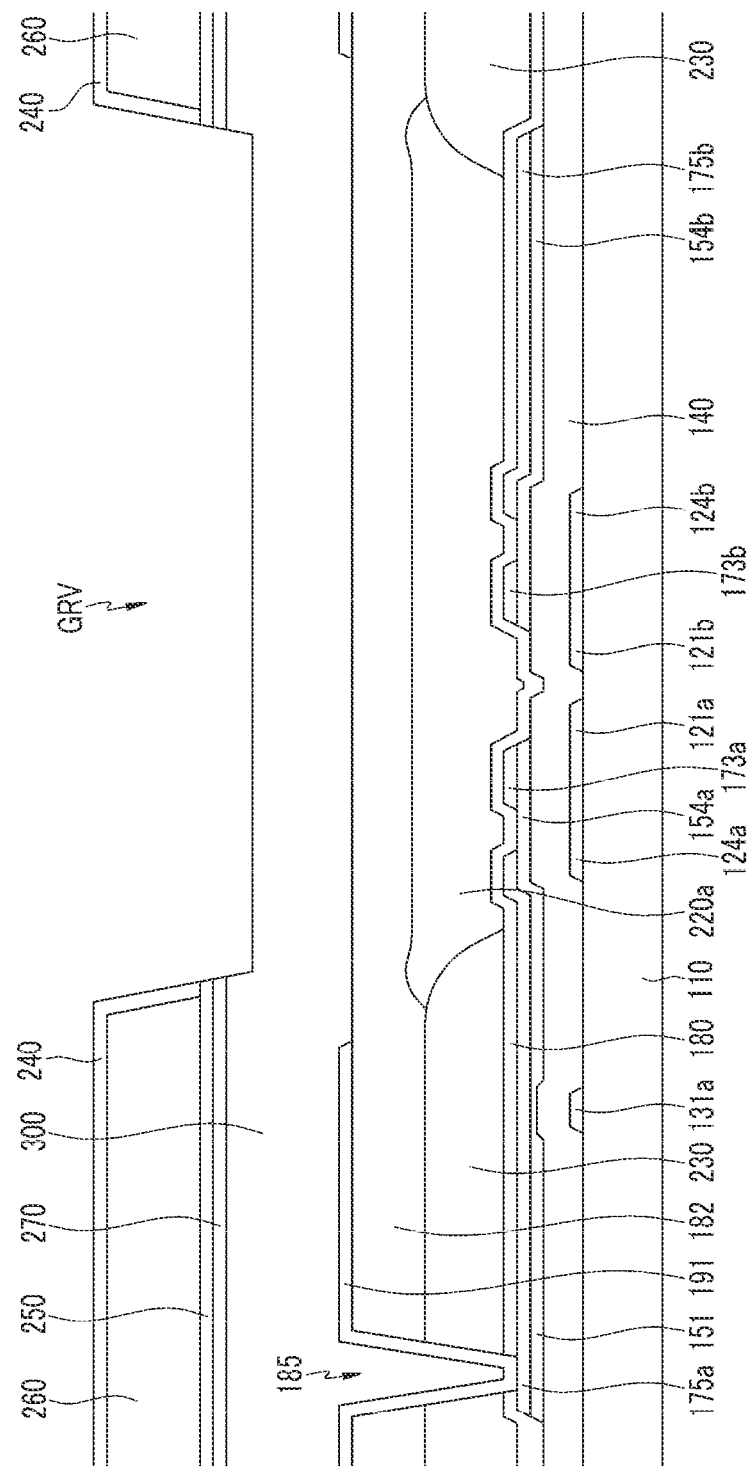

Next, referring to FIG. 11, the protection layer 240, the overcoat 250, and the common electrode 270 positioned at the portion corresponding to the groove GRV are sequentially patterned to expose the sacrificial layer 300. The sacrificial layer 300 corresponding to the groove GRV may be partially removed.

Figure 12:
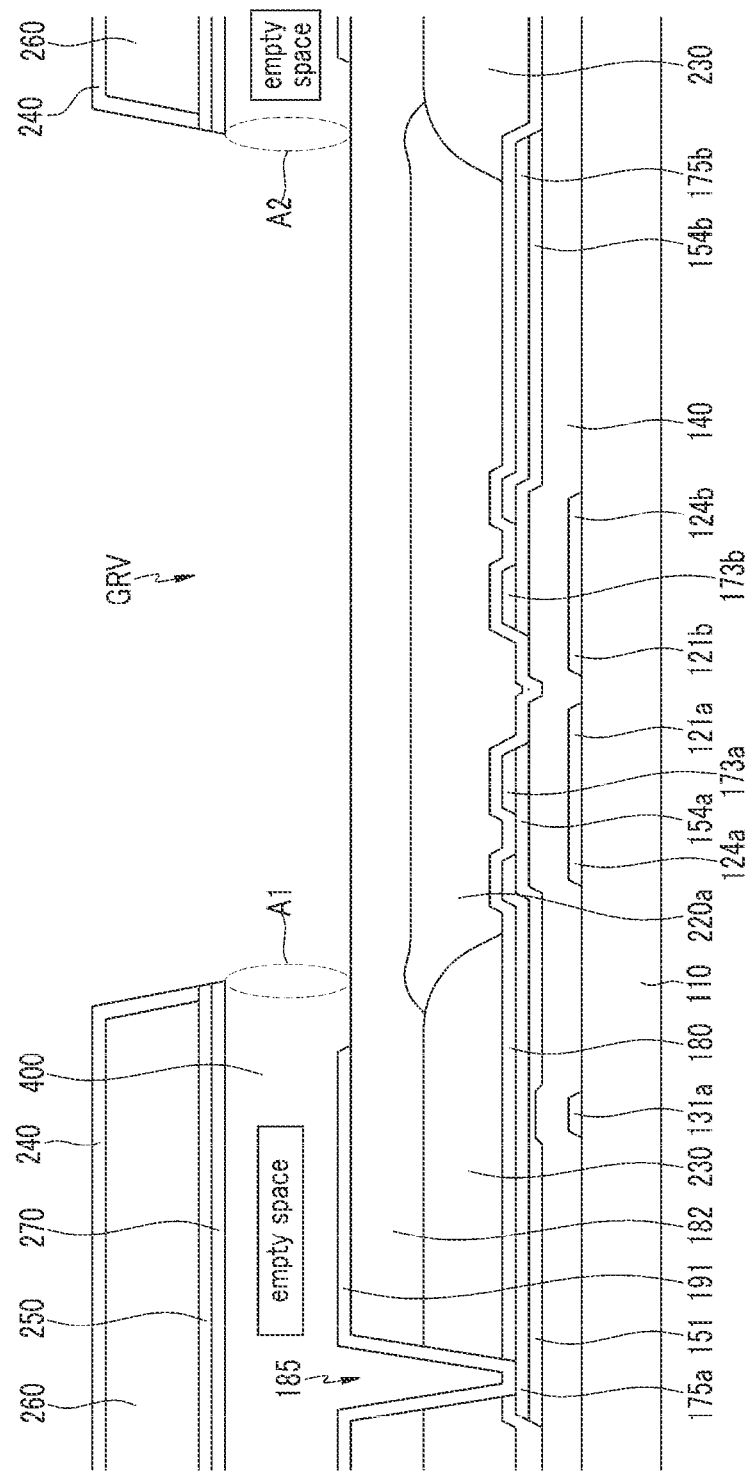
Figure 13:
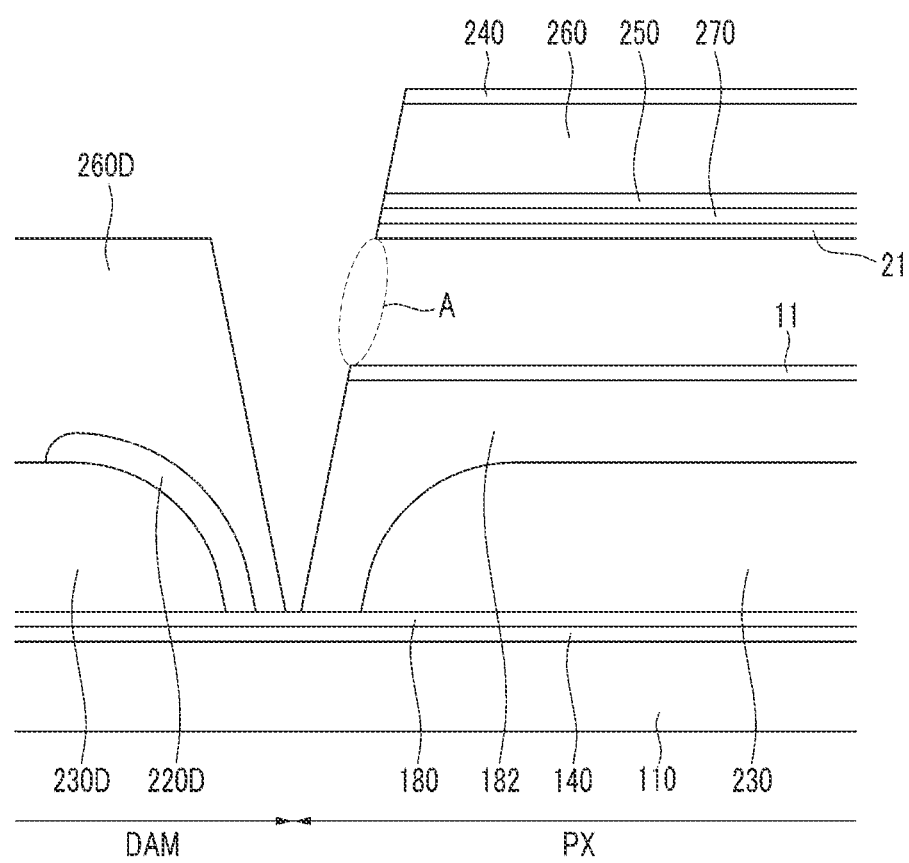
Figure 14:
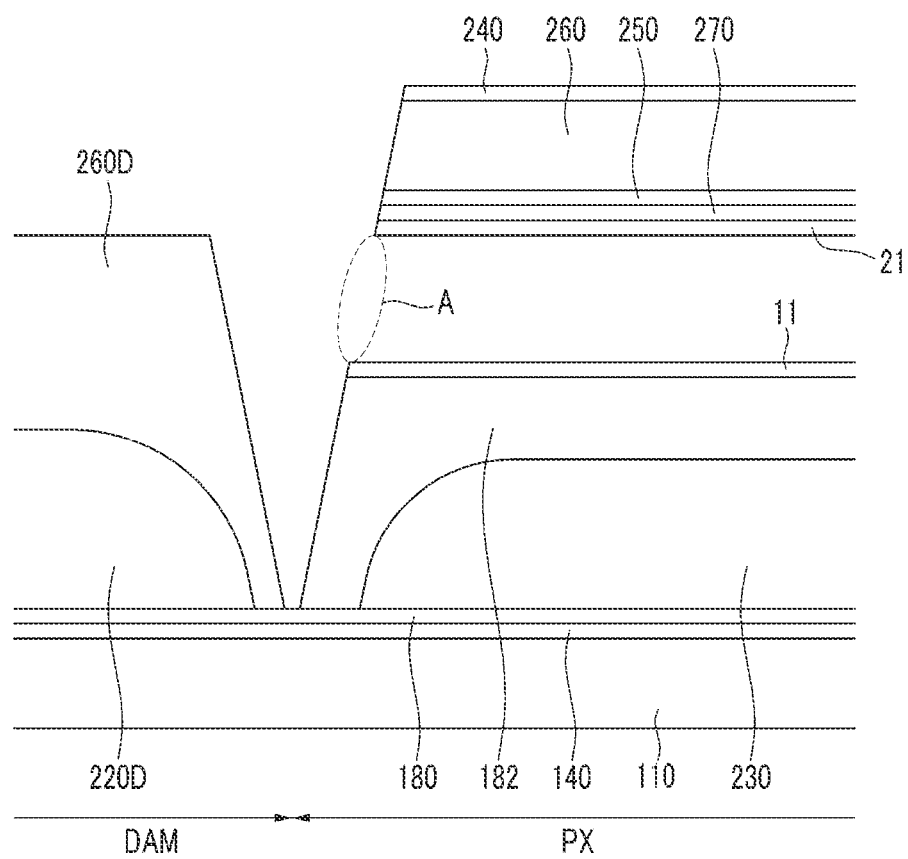
Figure 15:
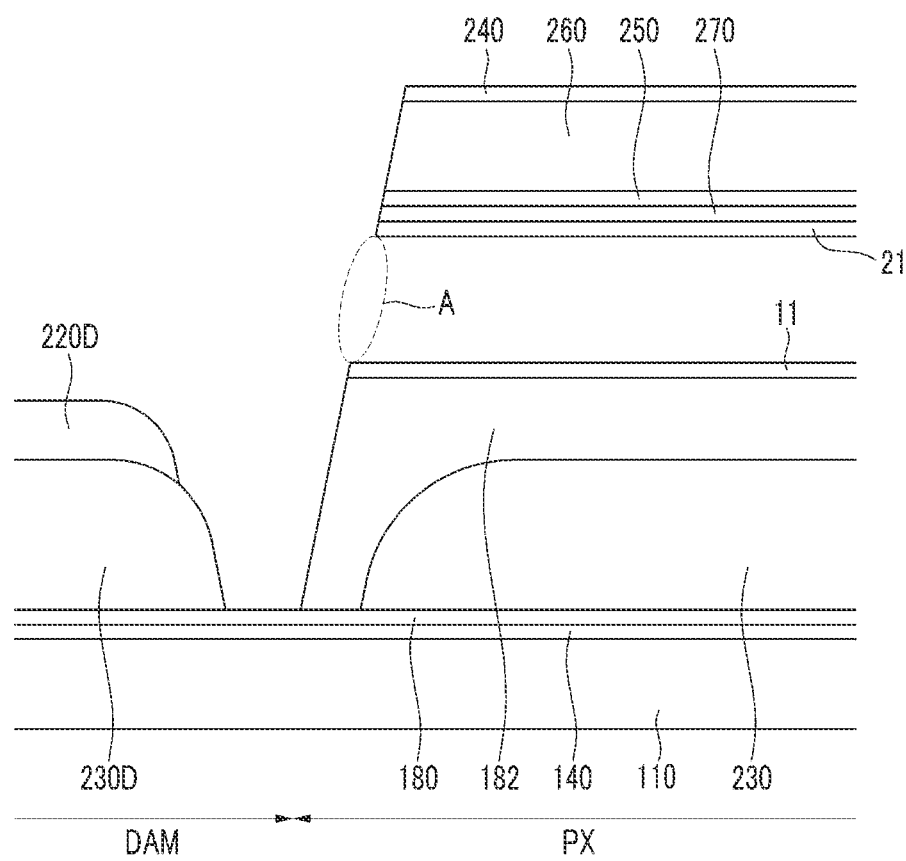
Figure 16:
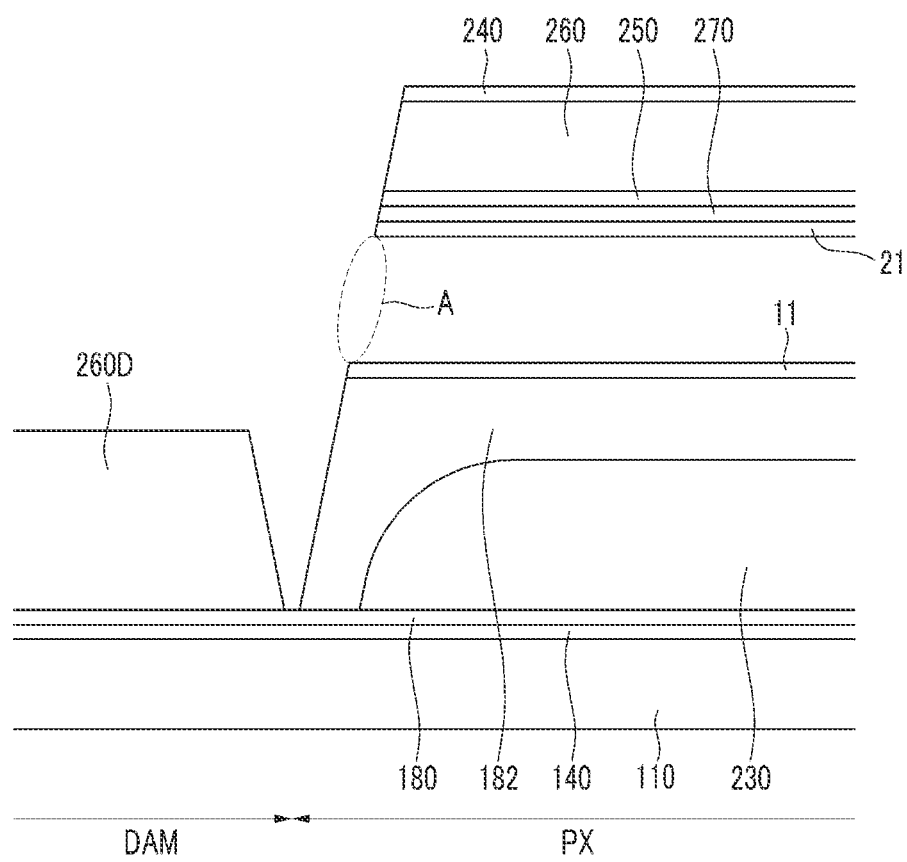

Referring to FIG. 12, the sacrificial layer 300 is removed through the groove GRV by an oxygen ($O_2$) ashing process or wet etching thereby forming a microcavity layer 400 having liquid crystal injection holes A1 and A2. The liquid crystal injection holes A1 and A2 may be formed in a direction parallel to the gate lines 121a and 121b.

A dam DAM may be formed near the pixel PX region according to various configurations. For example, referring to FIG. 13, an organic dam layer 230D, a light blocking dam member 220D, and a dam supporting member 260D are deposited near the pixel PX region to form a dam DAM. In some cases, referring to FIG. 14, the light blocking dam member 220D and the dam supporting member 260D are deposited near the pixel PX region to form the dam DAM. In some cases, referring to FIG. 15, the organic dam layer 230D and the light blocking dam member 220D are deposited near the pixel PX region to form the dam DAM. In some cases, referring to FIG. 16, the dam supporting member 260D is deposited near the pixel PX region to form the dam DAM.

The organic dam layer 230D may be disposed at the same time as organic layer 230 and may be formed of the same material. The light blocking dam member 220D may be disposed at the same time as the transverse light blocking member 220a and the longitudinal light blocking member 220b and may be formed of the same material. The dam supporting member 260D may be disposed at the same time as supporting member 260 and may be formed of the same material. Accordingly, in some cases, the dam DAM may be formed by at least one of the organic layer 230, the transverse light blocking member 220a and the longitudinal light blocking member 220b, and the supporting member 260.

Next, an alignment material is injected through the groove GRV and the liquid crystal injection hole A to form alignment layers 11 and 21 on the pixel electrode 191 and the common electrode 270. A bake process is performed after injecting the alignment material including a solid and a solvent through the liquid crystal injection hole A.

Next, a liquid crystal material including liquid crystal molecules 310 is injected to the microcavity layer 400 through the groove GRV and the liquid crystal injection hole A by an Inkjet method. The liquid crystal injection hole A may be smaller than the liquid crystal injection hole that is initially formed since the alignment layers 11 and 21 are formed.

In some cases, the groove GRV of the display device may be connected to a left end E1 and a right end E2 of the pixel PX column, and the liquid crystal material dripped at the groove GRV in the manufacturing process may be moved through the groove GRV. Accordingly, when the liquid crystal material is injected through the plurality of liquid crystal injection holes A, the liquid crystal material may be uniformly dispersed in the plurality of liquid crystal injection holes A. In addition, when the liquid crystal material provided at the groove GRV is injected to a plurality of liquid crystal injection holes A, the liquid crystal material in the groove GRV may move, but the dam DAM may prevent the remained liquid crystal material from leaking into the peripheral area.

Also, the groove GRV of the display device is formed between two pixel PX rows and two pixel rows PX adjacent thereto, that is, two pairs of pixel PX rows adjacent to each other. Also, the groove GRV defining the liquid crystal injection hole A of the display device may overlap the two gate lines 121a and 121b. Accordingly, a width of the groove GRV may be widened without deterioration of the aperture ratio of the display device. Furthermore, in the process of providing the liquid crystal material in a manufacturing process of the display device, the liquid crystal material may be uniformly disposed in the groove GRV.

Next, as shown in FIG. 3 to FIG. 5, a capping layer 280 covering the upper surface and the side wall of the supporting member 260 is formed. The capping layer 280 may cover the first and second liquid crystal injection holes A1 and A2 of the microcavity layer 400 exposed by the groove GRV.

Figure 17:
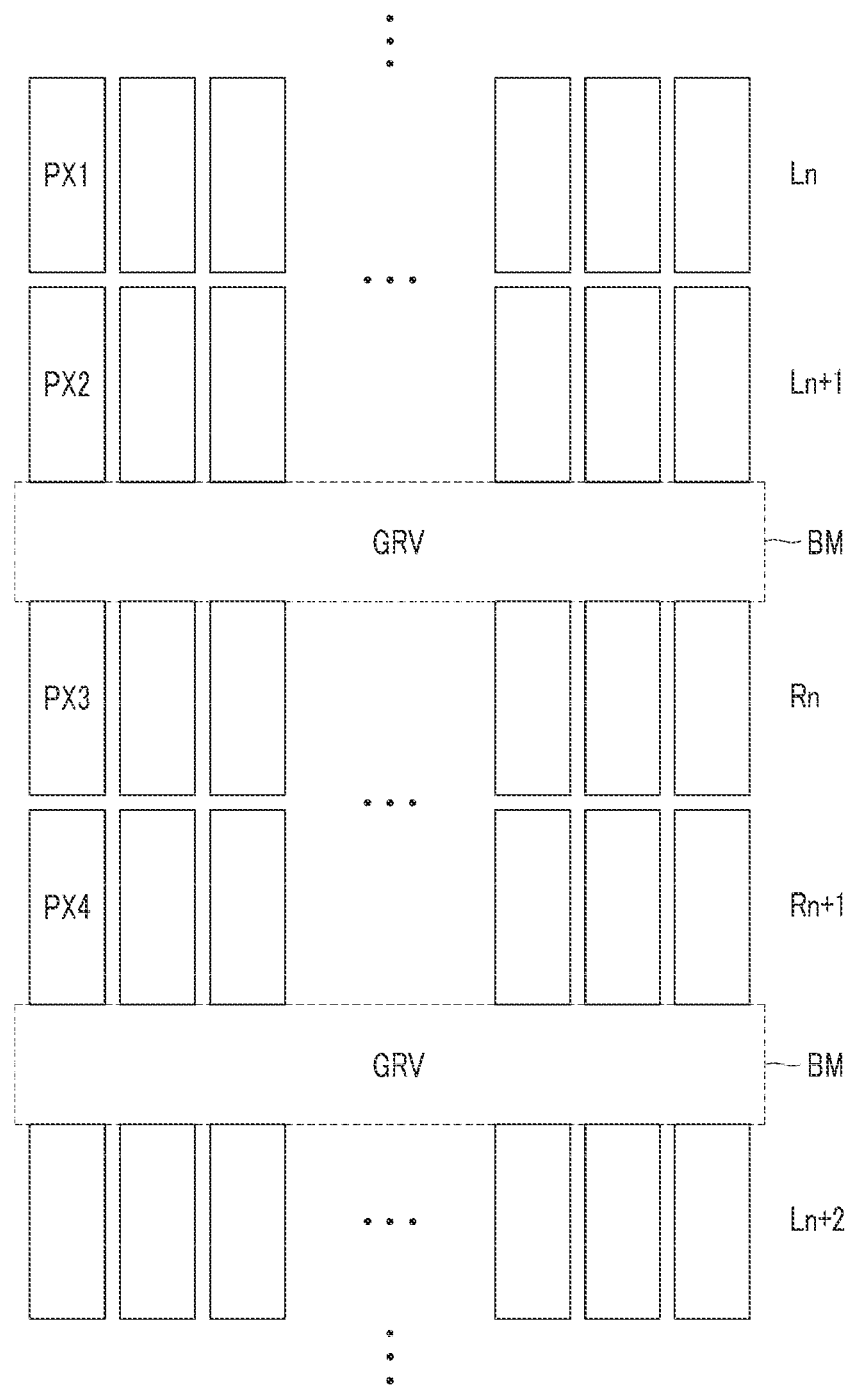
FIG. 17 is a layout view of a display device according to exemplary embodiments of the present invention.

Next, a display device will be described with reference to FIG. 17. FIG. 17 is a layout view of a display device according to exemplary embodiments of the present invention.

A display device, as shown in FIG. 17, may include a first pair of pixel rows including the first pixel PX1 and the second pixel PX2, and a second pair of pixel rows including the third pixel PX3 and the fourth pixel PX4. Pixels PX2 and PX3 may be separated via groove GRV. The groove GRV may overlap the light blocking member BM of the transverse light blocking member 220a.

Although not shown, the light blocking member BM may overlap a gate line and a data line, thin film transistors connected to the gate line and the data line, and contact holes connected to the thin film transistors and a pixel electrode. The thin film transistors may drive the second pixel PX2 of the first pair of pixel rows and the third pixel PX3 of the second pair of pixel rows.

In some cases, the display device may realize a 3D image display. When realizing the 3D image, the 3D image is input from a signal controller (not shown). The 3D image, including a left image and a right image, may be alternately output in a pixel row direction.

Among the first pair of pixel rows, a previous pixel row (e.g., the pixel row including the first pixel PX1) may display a left image Ln of an n-th row, and among the second pair of pixel rows, another previous pixel row (e.g., the pixel row including the third pixel PX3) may display a right image Rn of the n-th row. Also, among the first pair of pixel rows, a next pixel row (e.g., the pixel row including the second pixel PX2) may display the left image L(n+1) of the (n+1)-th row, and among the second pair pixel row, another next pixel row (e.g., the pixel row including the fourth pixel PX4) may display the right image R(n+1) of the (n+1)-th row.

Accordingly, in such a 3D image display method in which the left image and the right image are alternately displayed for a pixel row of the display device of a spatial division type, the left eye image may be an image recognized by a left eye of a user, and the right image may be an image recognized by a right eye of the user. A light blocking member may be formed between the pixel row displaying the left image and the pixel row displaying the right image, such that the left image and right image do not influence each other.

If the left image and the right image are alternately displayed according to each pixel row, the light blocking member may be respectively formed between the pixel rows, and thereby the entire aperture ratio of the display device is decreased and the resolution of the display device is also decreased.

However, in the case of the display device according to exemplary embodiments of the present invention, the groove GRV overlapping the light blocking member BM is positioned between two pairs of pixel rows. A pair of pixel rows of two pairs of pixel rows sequentially displays the left image, and the other pairs of pixel rows sequentially displays the right image, such that the 3D display using a patterned retarder may be realized while preventing the deterioration of the aperture ratio due to the black matrix.

As described above, in the display device according to exemplary embodiments of the present invention, one groove is formed between two pairs of gate lines that are positioned in a pair such that the width of the groove may be widened without the aperture ratio deterioration of the display device, and resultantly, the accuracy may be increased when providing the liquid crystal material in the liquid crystal injection hole.

Also, in the display device according to exemplary embodiments of the present invention, the groove defining the liquid crystal injection hole may be formed in one line, thereby the liquid crystal material injected through a plurality of liquid crystal injection holes may be uniformly dispersed through the groove, and resultantly, the amount of the liquid crystal material may be easily controlled. Further, the groove is connected to the outermost pixel and a dam is formed near the display area such that the liquid crystal material injected through the liquid crystal injection hole may be prevented from flowing out past the outermost pixel.

Also, in the display device according to exemplary embodiments of the present invention, a light blocking member may overlap the groove positioned between two pairs of gate lines that are positioned in a pair, among two pairs of pixel rows. One pair of pixel rows may display the left image and the other pair of pixel rows may display the right image such that a 3D display using the patterned retarder is realized while preventing the aperture ratio deterioration due to a black matrix.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
a substrate comprising a pixel area and a peripheral area enclosing the pixel area;
a thin film transistor disposed on the pixel area of the substrate;
a pixel electrode connected to the thin film transistor;
a supporting member disposed on the pixel electrode to be spaced apart from the pixel electrode by a microcavity layer therebetween;
a liquid crystal layer disposed in the microcavity layer;
a color filter and a light blocking member disposed on the pixel area of the substrate; and
a dam disposed on the peripheral area of the substrate, wherein the pixel area is enclosed by the dam, a trench is disposed between the dam and the pixel area, and
wherein the dam comprises the same material as at least one of the supporting member, the color filter, and the light blocking member.

2. The display device of claim 1, further comprising:
a plurality of pixel rows and a plurality of pixel columns disposed in the pixel area, and
wherein the plurality of pixel rows and the plurality of pixel columns are enclosed by the dam.

3. The display device of claim 2, wherein:
the plurality of pixel rows comprise a first pair of pixel rows and a second pair of pixel rows adjacent to the first pair of pixel rows, and
the microcavity layer comprises a first microcavity layer overlapping with the first pair of pixel rows and a second microcavity layer separated from the first microcavity layer, the second microcavity layer overlapping with the second pair of pixel rows.

4. The display device of claim 3, further comprising
a first gate line and a second gate line disposed on the pixel area of the substrate and disposed between the first pair of pixel rows and the second pair of pixel rows; and
a data line disposed between two adjacent pixel columns among the plurality of pixel columns.

5. The display device of claim 4, wherein:
portions of the supporting member are separated by a groove, and
the groove overlaps the first gate line and the second gate line.

6. The display device of claim 5, further comprising:
a light blocking member disposed under the microcavity layer, and
the light blocking member overlaps the groove.

7. The display device of claim 5, wherein:
the groove extends to a left end of the plurality of pixel rows and a right end of the plurality of pixel rows.

8. The display device of claim 1, wherein:
the color filter and the light blocking member are disposed under the microcavity layer, and
wherein the dam is disposed in the same layer as at least one of the supporting member, the color filter, and the light blocking member.

9. The display device of claim 8, wherein:
the dam comprises a dam supporting member comprising the same material as the supporting member.

10. The display device of claim 9, wherein:
the dam further comprises a light blocking dam member comprising the same material as the light blocking member.

11. The display device of claim 10, wherein:
the dam supporting member is disposed on the light blocking dam member.

12. The display device of claim 10, wherein:
the dam further comprises an organic dam layer comprising the same material as the color filter.

13. The display device of claim 12, wherein:
the light blocking dam member is disposed on the organic dam layer.

* * * * *